(12) United States Patent
Lazarev et al.

(10) Patent No.: US 7,267,849 B2
(45) Date of Patent: Sep. 11, 2007

(54) COMPENSATOR FOR LIQUID CRYSTAL DISPLAY

(75) Inventors: Pavel I. Lazarev, London (GB);
Mikhail V. Paukshto, Foster City, CA (US)

(73) Assignee: Nitto Denko Corporation, Ibaraki-shi (JP)

( * ) Notice: Subject to any disclaimer, the term of this patent is extended or adjusted under 35 U.S.C. 154(b) by 190 days.

(21) Appl. No.: 11/070,513

(22) Filed: Mar. 1, 2005

(65) Prior Publication Data

US 2005/0196550 A1  Sep. 8, 2005

Related U.S. Application Data

(60) Provisional application No. 60/549,792, filed on Mar. 2, 2004.

(51) Int. Cl.
*G02F 1/13363* (2006.01)
*G02B 5/30* (2006.01)

(52) U.S. Cl. .................. 428/1.1; 349/75; 349/117; 349/121; 428/1.31

(58) Field of Classification Search ................ 428/1.1, 428/1.3, 1.31; 349/117, 75, 121; 252/299.01, 252/299.61, 299.62
See application file for complete search history.

(56) References Cited

U.S. PATENT DOCUMENTS 2,553,961 A    5/1951  Dreyer
5,699,136 A   12/1997  Arakawa et al.
5,736,066 A *  4/1998  Noguchi et al. ....... 252/299.01
5,739,296 A    4/1998  Gvon et al.
5,995,184 A * 11/1999  Chung et al. ................ 349/118
6,174,394 B1   1/2001  Gvon et al.
6,583,284 B1 * 6/2003  Sidorenko et al. .......... 544/342
6,599,443 B1 * 7/2003  Sharples et al. ....... 252/299.63
7,045,177 B2 * 5/2006  Dutova et al. ................ 428/1.1
7,204,938 B2 * 4/2007  Lazarev ................. 252/299.01
2003/0193635 A1* 10/2003  Mi et al. ..................... 349/117

FOREIGN PATENT DOCUMENTS

EP    0 656 559 A1    6/1995
EP    0 676 652 A2   10/1995
EP    0 961 138 A1   12/1999

OTHER PUBLICATIONS

Lazarev, P., et al., *Displays, Materials and Components*, Proceedings of the 7th International Workshop, Kobe Japan, Nov. 29, 2000, pp. 1159-1160.
Lydon, J., *Chormonics*, in Handbook of Liquid Crystals, (Wiley VCH: Winheim, 1998. V. 2b, pp. 981-1007.

* cited by examiner

*Primary Examiner*—Shean C. Wu
(74) *Attorney, Agent, or Firm*—Westerman, Hattori, Daniels & Adrian, LLP.

(57) ABSTRACT

A compensator element for a liquid crystal display is provided comprising at least one layer of negative biaxial burefringement material formed by at least one polycyclic organic compound.

7 Claims, 8 Drawing Sheets

COMPENSATOR FOR LIQUID CRYSTAL DISPLAY

CROSS REFERENCE TO RELATED APPLICATIONS

This application claims the benefit of, and priority to, U.S. Provisional Patent application Ser. No. 60/549,792 filed on Mar. 2, 2004, entitled "Compensator for Liquid Crystal Display" the entire disclosure of which is incorporated by reference herein.

FIELD OF THE INVENTION

This invention is related to the design of liquid crystal displays (LCDs) and, more particular, to techniques for maximizing the field of view of such displays by maintaining a high contrast ratio and minimal variance in relative gray levels over a wide range of viewing angles.

BACKGROUND OF THE INVENTION

Liquid crystal displays (LCDs) are widespread used in watches and clocks, photographic cameras, technical instruments, computers, flat TV, projection screens and large area of information devices. The information in many liquid crystal displays is presented in the form of a row of numerals or characters, which are generated by a number of segmented electrodes arranged in a pattern. The segments are connected by individual leads to driving electronics, which applies a voltage to the appropriate combination of segments to display the desired information by controlling the light transmitted through the segments. Graphic information or television displays may be achieved by a matrix of pixels, which are connected by an X-Y sequential addressing scheme between two sets of perpendicular conductors. More advanced addressing schemes use arrays of thin film transistors to control the drive voltage at the individual pixels. This scheme is applied predominantly to twisted nematic liquid crystal displays, but is also finding use in high performance versions of super twist liquid crystal displays.

Ideal display should show equal contrast and color rendering, looking on them under different angles, deviating from the normal observation direction. The different kinds of displays based on nematic liquid crystal, however, possess an angle dependence of the contrast. This is, at angles deviating from the normal observation direction, the contrast becomes lower and the visibility of the information is diminished. The materials commonly used in nematic LCD's are optically positively uniaxially birefringent, this is extraordinary refractive index $n_e$ is larger then the ordinary refractive index $n_o$; $\Delta n=n_e-n_o>0$. The visibility of the displays under oblique angles can be improved by use of optical compensators with negative birefringence ($\Delta n<0$). In addition, the loss of contrast is caused by light leaking through the black state pixel elements at large viewing angles. In color liquid crystal displays, the leakage also causes severe color shifts for both saturated and gray scale colors. These limitations are particularly important for avionics applications, where copilot viewing of the pilot's displays is important. It would be a significant improvement in the art to provide a liquid crystal display capable of presenting a high quality, high contrast image over a wide field of view.

Optical compensators comprising discotic nematic or monoaxial columnar phases which are oriented in the liquid crystalline state are disclosed in EP 0 656 559. The solid-discotic phase transitions are very high; therefore heating to temperatures above 200 DEG C. is necessary. This is an inconvenient procedure and may cause decomposition in the quite sensitive materials.

An improvement of using discotic materials for optical compensators are disclosed in U.S. Pat. No. 5,699,136. The materials comprise discotic nematic phases with negative optical birefringence consisting of molecular weight liquid crystal oriented in polymer matrix, including a large variety of chemical structures. All these phases must be oriented in the discotic liquid crystalline state, applying alignment layers or electrical or magnetic fields, after having transformed the materials in the liquid crystalline state at markedly elevated temperatures. The optical axis is inclined by an angle of 10 to 40° to the direction perpendicular to sheet surface.

A method for lowering the phase transition temperatures of the discotic nematic phases by at least 10 DEG C. is disclosed in EP 0 676 652 A2, however, the transition temperatures remain as high as 105 DEG C. or higher. This means, that this method also desires strong heating of the layers, connected with the said disadvantages.

Also a multilayer thin film compensator is used to provide a liquid crystal display capable of presenting a high quality, high contrast image over a wide field of view. That multilayer compensator including a first plurality of layers, each having a first refractive index and a first thickness, alternating with a second plurality of layers, each having a second refractive index and a second thickness. The values of the first and second refractive indices and thicknesses are such that the phase retardation of the multilayer is equal in magnitude but opposite in sign to the phase retardation of the liquid crystal layer in its homeotropically aligned state over a predetermined range of viewing angles.

Organic dichroic dyes are a new class of materials currently gaining prominence in the manufacture of optically anisotropic films with desirable optical and working characteristics. Films based on these materials are formed by coating a liquid crystal (LC) aqueous solution of supramolecules formed by dye molecules on a substrate surface with the following water evaporation. The produced films are imbued with anisotropic properties either by preliminary mechanical ordering of the underlying substrate surface as described in U.S. Pat. No. 2,553,961 or by applying external mechanical, electromagnetic, or other orienting forces to the coating on a liquid crystal substrate material as described in U.S. Pat. Nos. 5,739,296 and 6,174,394.

New type of materials for manufacturing optical anisotropic films is known in the prior art. The same films are formed from lyotropic liquid crystal on based supramolecules. Substantial ordering of dye molecules in columns allows use of these mesophases to create oriented, strongly dichroic films. Dye molecules that form supramolecular liquid crystal mesophases are special. They contain functional groups located at a molecule periphery that determine the water solubility of the dye. Organic dye mesophases are characterized by specific structures, phase diagrams, optical properties and dissolving capabilities as described in greater detail in J. Lydon, Chromonics, in *Handbook of Liquid Crystals*, (Wiley VCH: Weinheim, 1998), V. 2B, p. 981-1007.

Anisotropic films characterized by high optical anisotropy may be formed from LLC systems based on dichroic dyes. Such films exhibit both the properties of E-type polarizers, due to light absorption by supramolecular complexes, and the properties of retarders. Retarders are films with phase-retarding properties in those spectral regions where absorption is lacking. Phase-retarding properties of the films are determined by their double refraction properties: different refraction indices in the direction of LC solution deposition and the direction orthogonal to the deposition direction. If high-strength dyes are used for the film formation, the films are also characterized by high thermal and photo stability.

Extensive investigations aimed at developing new methods of creating dye-based films through manipulation of deposition conditions are currently underway. Of additional interest is the development of new compositions of lyotropic liquid crystals. New LLC compositions may be developed through the introduction of modifying, stabilizing, surfactant and other additives to known dyes, thus improving film characteristics. More detailed discussions of these processes are provided in U.S. Pat. Nos. 5,739,296 and 6,174,394 and published patent application EP 961138.

It is goal of this invention to provide a simple reliable process for producing compensation plates (in particular: "negative A-plate", "positive" and "negative C-plate") for LCD of different types.

SUMMARY OF THE INVENTION

The compensator design, which comprises at least one layer of negative biaxial birefringent material of crystal structure, makes possible a significant improvement in color rendering properties and contrast ratios of liquid crystal displays over a wide range of viewing angle.

A compensator for a liquid crystal display comprises at least one layer of negative biaxial birefringent material, which is transparent in working range, and the birefringent material has a crystal structure formed by at least one polycyclic organic compound with conjugated π-system, and an intermolecular spacing of 3.4±0.3 Å is in the direction of extraordinary optical axes.

BRIEF DESCRIPTION OF DRAWINGS

FIGS. 11(a) and (b) are the conoscopy (a) and contrast ratio map (b) for the twisted LC layer compensated by o-plates between the crossed O-type polarizers.

DETAILED DESCRIPTION OF THE INVENTION

The type of optical compensation required depends upon the type of display, normally black or normally white, which is used.

Every optically anisotropic media is characterized by its second rank dielectric tensor. The classification of the compensator plates is tightly connected to the orientation of the principal axes of a particular dielectric tensor with respect to the natural coordinate frame of the plate. The natural xyz coordinate frame of the plate is chosen in a way when the z-axis is parallel to its normal direction.

Figure 1:
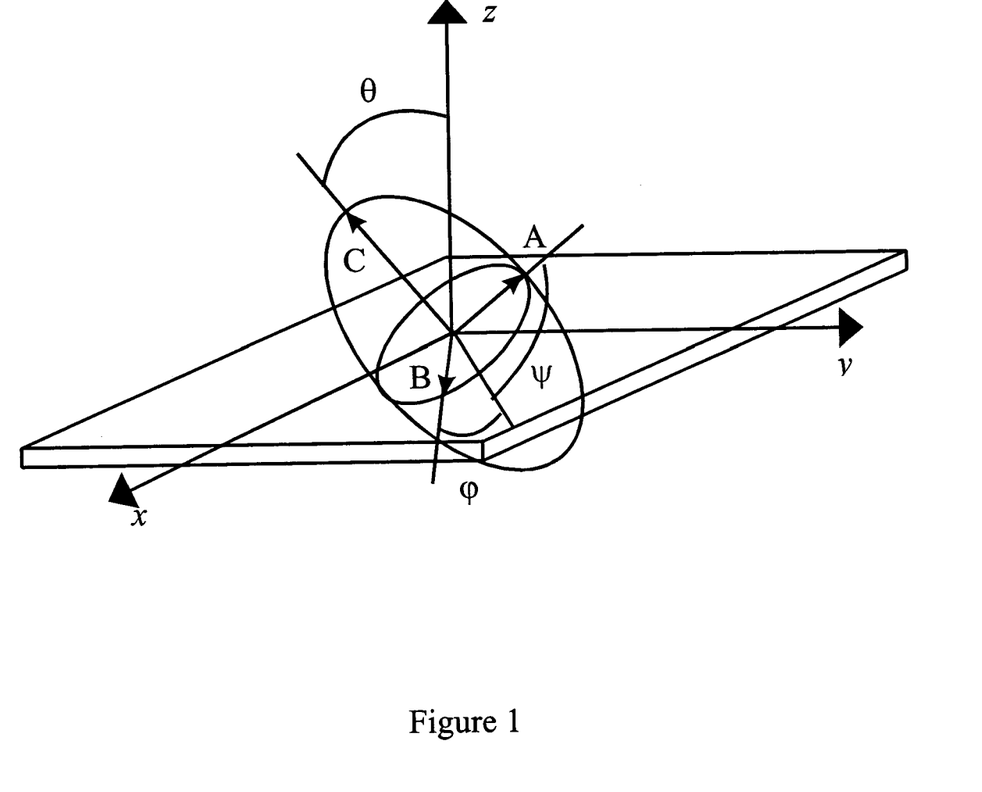
FIG. 1 demonstrates a principal dielectric tensor axes orientation in general case of optically anisotropic media.

The orientation of the principal axes can be characterized by three Euler angles θ, φ, Ψ, which, together with the principal dielectric tensor components ($\epsilon_A$, $\epsilon_B$, $\epsilon_C$) uniquely define different types of the optical compensators (FIG. 1). The case when all the principal components of the dielectric tensor are unequal corresponds to the biaxial compensator. In this case the plate has two optical axes. For instance, in case of $\epsilon_A<\epsilon_B<\epsilon_C$ these optical axes are in the plane of C and A axes on both sides with respect to the C-axis. In a uniaxial limit when $\epsilon_A=\epsilon_B$ we have the degenerated case when these two axes coincide with the C-axis that is just a single optical axis.

The zenithal angle θ between the C-axis and the z-axis are most important in definitions of different compensator types.

Figure 2:
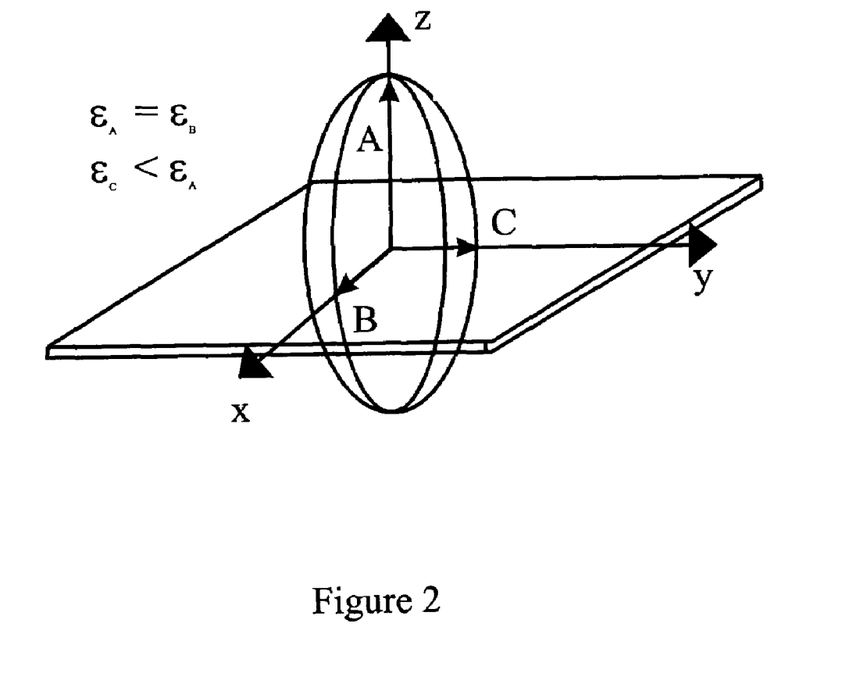
FIG. 2 demonstrates a principal dielectric tensor axes orientation in cases a negative A-plate compensator.
Figure 3:
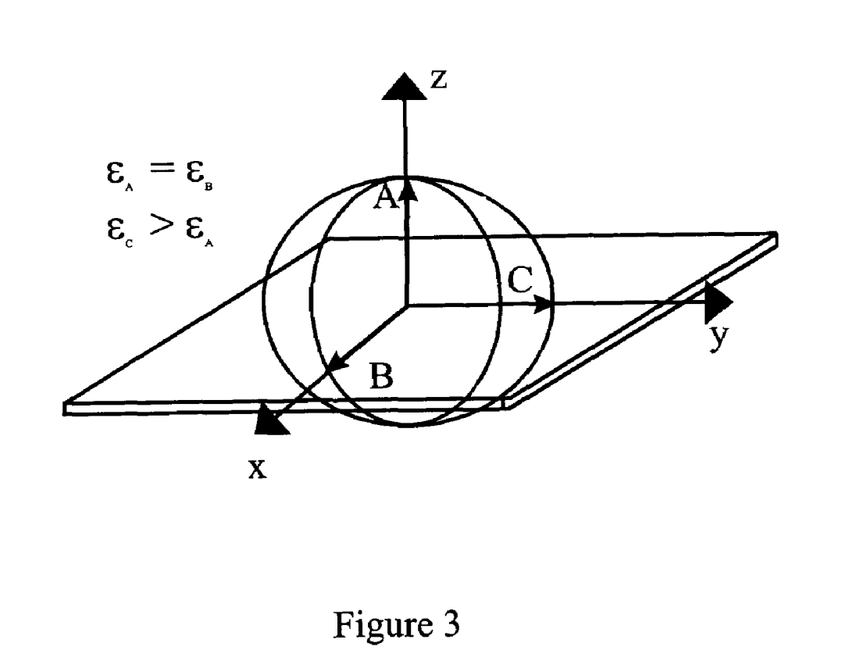
FIG. 3 demonstrates a principal dielectric tensor axes orientation in cases a positive A-plate compensator.

If a plate is defined by Euler angle θ=π/2 and $\epsilon_A=\epsilon_B$, $\neq\epsilon_C$ then it is called "A-plate". In this case the principal C-axis lies in the plane of the plate (xy-plane), while A-axis is normal to the plane surface (due to the uniaxial degeneration the orthogonal orientations of A and B-axes can be chosen arbitrary in the plane that is normal to the xy-surface). In a case of $\epsilon_A=\epsilon_B<\epsilon_C$ the plate is called "positive A-plate" (FIG. 2). Contrary, if $\epsilon_A=\epsilon_B>\epsilon_C$ the plate is defined as the "negative A-plate" (FIG. 3).

Figure 4:
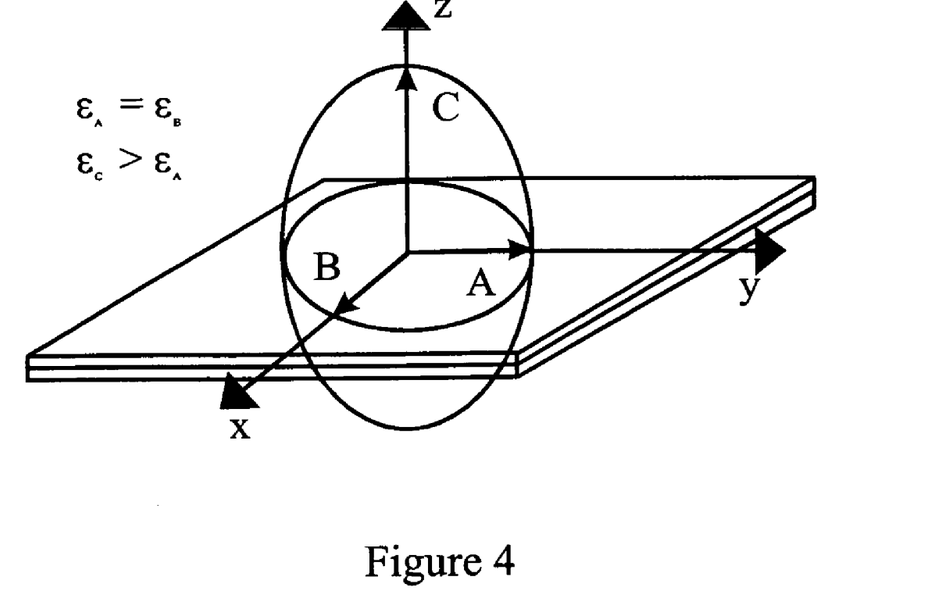
FIG. 4 demonstrates a principal dielectric tensor axes orientation in cases a positive C-plate compensator.
Figure 5:
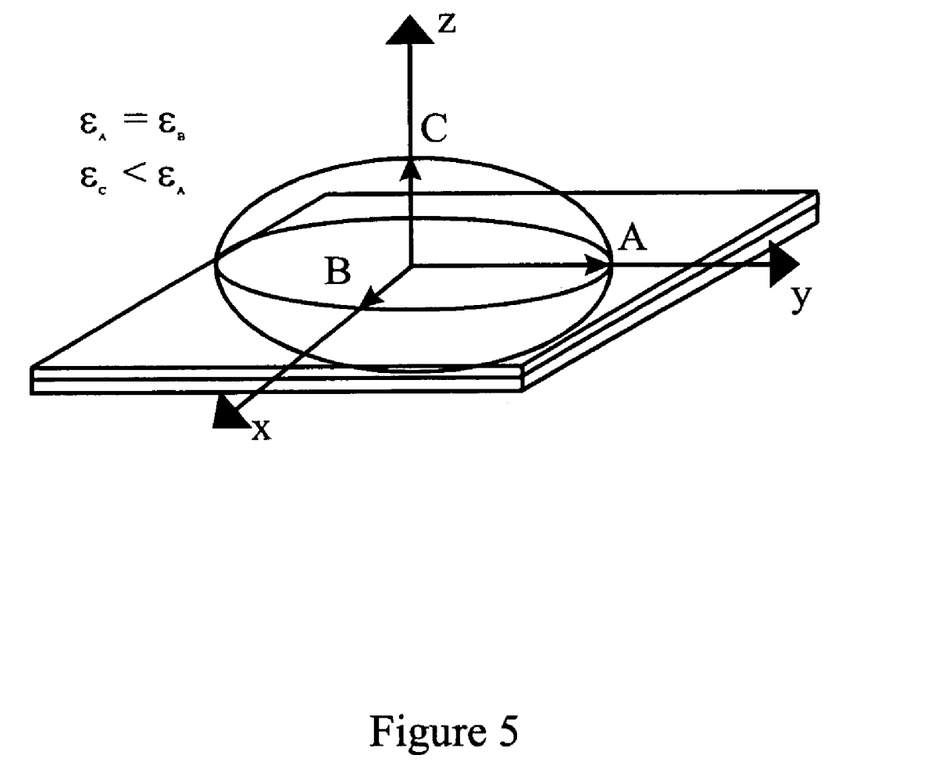
FIG. 5 demonstrates a principal dielectric tensor axes orientation in cases a negative C-plate compensator.

Uniaxial C-Plate is defined by value of Euler angle θ=0 and $\epsilon_A=\epsilon_B$, $\neq\epsilon_C$. Thus the principal C-axis is normal with respect to the plate surface (xy-plane). In a case of $\epsilon_A=\epsilon_B<\epsilon_C$ the plate is called "positive C-plate" (FIG. 4). Contrary, if $\epsilon_A=\epsilon_B>\epsilon_C$ the plate is defined as the "negative C-plate" (FIG. 5).

Similar to the A-plate case, the C-plates can be either positive ($\epsilon_A=\epsilon_B<\epsilon_C$) or negative ($\epsilon_A=\epsilon_B>\epsilon_C$).

In a normally black display (FIG. 6), the twisted nematic cell 1 is placed between polarizers 2 and 3, whose transmission axes are parallel to one another and to the orientation of the director of the liquid crystal at the rear of the cell (i.e., the side of the cell away from the viewer).

Figure 6:
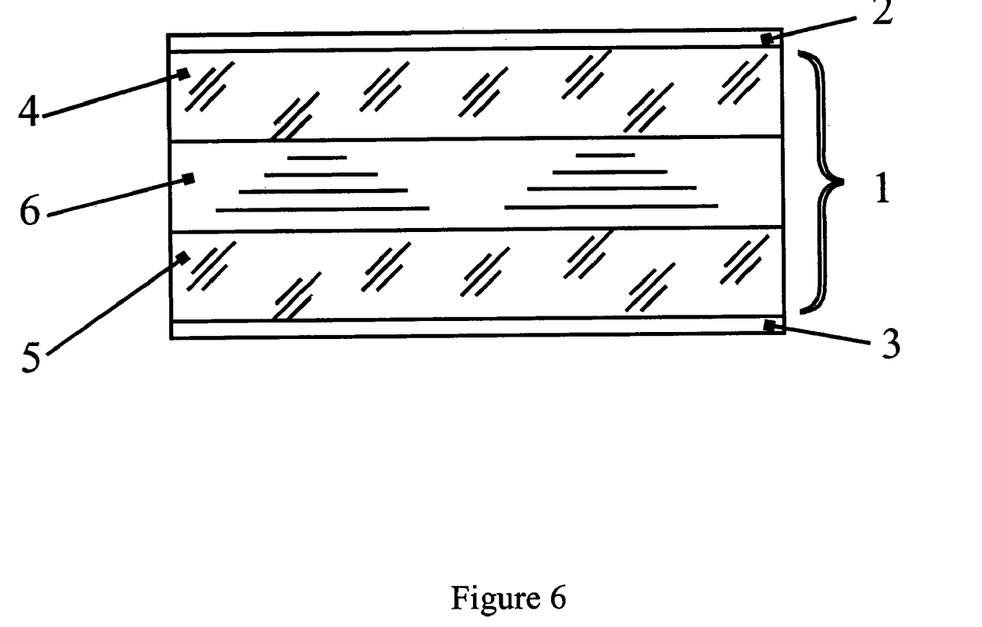
FIG. 6 is a block diagram showing the optical construction of a liquid crystal display (Prior Art)

The twisted nematic cell 1 usually comprises two parallel flat plates 4 and 5, the inside surface of which are coated with patterns of optically transparent conducting material and the alignment layer (in Figure there is not shown). The space between plates is filled with liquid crystal 6, which forms a layer 5-20 mkm thick and plays the role of the active medium that changes its optical qualities under the influence of electric field. In the unenergized state (no applied voltage), normally incident light from the backlight is polarized by the first polarizer and in passing through the cell has its polarization direction rotated by the twist angle of the cell. This is caused by adiabatic following, which is also known as the waveguiding effect. The twist angle is set to 90 DEG so that the light is blocked by the output polarizer. When a voltage is applied across the cell, the liquid crystal molecules are forced to more nearly align with the electric field, eliminating the twisted nematic symmetry. In this orientation, the optical (c-axis) of the cell is perpendicular to the cell walls. The liquid crystal layer then appears isotropic to normally incident light, eliminating the waveguiding effect so that the polarization state is unchanged by propagation through the liquid crystal layer and such light can pass through the output polarizer. Patterns can be written in the display by selectively applying a voltage to the portions of the display which are to appear illuminated.

When viewed at large angles, however, the dark (unenergized) areas of a normally black display will appear light because of angle-dependent retardation effects for light passing through the liquid crystal layer at such angles, i.e., off-normal incidence light senses an angle-dependent change of polarization. Contrast can be restored by using a compensating element which has an optical symmetry similar to that of the twist cell but which reverses its effect. One method is to follow the active liquid crystal layer with a twist cell of reverse helicity. Another is to use one or more A-plate retarder compensators. These compensation methods work because the compensation element shares an optical symmetry with the twisted nematic cell; both are uniaxial birefringent material having an extraordinary axis orthogonal to the normal light propagation direction. These approaches to compensation have been widely utilized because of the ready availability of materials with the required optical symmetry.

Despite the effectiveness of these compensation techniques, there are drawbacks to this approach associated with the normally black operational mode. The appearance of a normally black display is very sensitive to cell gap. Consequently, in order to maintain a uniform dark appearance it is necessary to make the liquid crystal cell very thick, which results in unacceptably long liquid crystal response times, or to operate at a Gooch-Tarry. This approach, however, imposes manufacturing tolerances on the liquid crystal cell gap which are difficult to achieve. In addition, the reverse twist compensation technique requires the insertion of a second liquid crystal cell into the optical train, adding significant cost, weight, and bulk to the display. For these reasons, it is highly desirable to compensate a normally white display in order to avoid these disadvantages.

In the normally white display configuration, the 90 DEG twisted nematic cell is placed between polarizers which are crossed, such that the transmission axis of each polarizer is parallel to the director orientation of the liquid crystal molecules in the region of the cell adjacent to it. This reverses the sense of light and dark from that of the normally black display. The unenergized (no applied voltage) areas appear light in a normally white display, while those which are energized appear dark. The problem of ostensibly dark areas appearing light when viewed at large angles still occurs, but the reason for it is different and its correction requires a different type of optical compensating element. In the energized areas the liquid crystal molecules tend to align with the applied electric field. If this alignment were perfect, all the liquid crystal molecules in the cell would have their long axes normal to the substrate glass. This arrangement, known as the homeotropic configuration, exhibits the optical symmetry of a positively birefringent C-plate. In the energized state the normally white display appears isotropic to normally incident light, which is blocked by the crossed polarizers.

The loss of contrast with viewing angle occurs because the homeotropic liquid crystal layer does not appear isotropic to off normal light. Light directed at off normal angles propagates in two modes due to the birefringence of the layer, with a phase delay between those modes which increases with the incident angle of the light. This phase dependence on incidence angle introduces an ellipticity to the polarization state which is then incompletely extinguished by the second polarizer, giving rise to light leakage. Because of the C-plate symmetry, the birefringence has no azimuthal dependence. Clearly what is needed is an optical compensating element, also in C-plate symmetry, but with negative ($n_e < n_o$) birefringence. Such a compensator would introduce a phase delay opposite in sign to that caused by the liquid crystal layer, thereby restoring the original polarization state, allowing the light to be blocked by the output polarizer.

This technique has not been used in the past because it has been difficult or impossible to construct a C-plate compensator with the required optical symmetry. There has been no way found to stretch or compress polymers to obtain large area films with negative C-plate optical symmetry and the required uniformity, nor is it possible to form a compensator from a negatively birefringent crystal such as sapphire. In order for such a compensator to be effective, the phase retardation of such a plate would have to have the same magnitude as the phase retardation of the liquid crystal and would also have to change with viewing angle at the same rate as the change of the liquid crystal's phase retardation. These constraints imply that the thickness of the negative plate would thus be on the order of 10 mkm, making such an approach very difficult to accomplish because it would require the polishing of an extremely thin plate having the correct (negative) birefringence while ensuring that the surfaces of the plate remained parallel. Since such displays are relatively large in size, the availability of a negatively birefringent crystal of sufficient size would also be a major difficulty. Compensation techniques have been proposed which utilize crossed A-plate compensators. Such an arrangement, however, cannot produce a compensator with azimuthal (C-plate) symmetry. Because of these difficulties, the tendency in the art has been to rely on normally black displays, even though the normally white type could produce a superior quality display if an appropriate compensator were available.

The disclosed compensator for a liquid crystal display comprises at least one layer of negative biaxial birefringent material, which is thin crystal film (TCF) based on an aromatic polycyclic compound. This material usually possesses negative biaxial features $n^1_o \geq n^2_o > n_e$. The extraordinary optical axes of the same materials always coincide with direction of alignment. For practical applications the thin crystal films may be regard as uniaxial films: $n^1_o \approx n^2_o$.

A necessary condition is the presence of a developed system of π-conjugated bonds between conjugated aromatic rings of the molecules and the presence of groups (such as amine, phenol, ketone, etc.) lying in the plane of the molecule and involved into the aromatic system of bonds. The molecules and/or their molecular fragments possess a planar structure and are capable of forming supramolecules in solutions. Another necessary condition is the maximum overlap of π orbitals in the stacks of supramolecules. A selection of raw materials for manufacturing the compensator deals with spectral characteristics of these compounds.

Aromatic polycyclic compounds suitable for the obtaining of TCFs are characterized by the general formula {R}{F}n, where R is a polycyclic fragment featuring a π electron system, F is a modifying functional group ensuring solubility of a given compound in nonpolar or polar solvents (including aqueous media), and n is the number of functional groups.

Said TCFs can be obtained by a method called Cascade Crystallization Process developed by Optiva, Inc. [P. Lazarev and M. Paukshto, Proceedings of the 7th International Workshop "Displays, Materials and Components" (Kobe, Japan, Nov. 29-Dec. 1, 2000), pp. 1159-1160]. According to this method such an organic compound dissolved in an appropriate solvent forms a colloidal system (lyotropic liquid crystal solution) in which molecules are aggregated into supramolecules constituting kinetic units of the system. This liquid crystal phase is essentially a precursor of the ordered state of the system, from which a solid anisotropic crystal film (sometimes also called thin-film crystal, TCF) is formed in the course of subsequent alignment of the supramolecules and removal of the solvent.

A method stipulated for the synthesis of thin crystal films from a colloidal system with supramolecules includes the following stages:

(i) application of the aforementioned colloidal system onto a substrate (or onto a device or a layer in a multilayer structure); the colloidal system must possess thixotropic properties, which are provided by maintaining a preset temperature and a certain concentration of the dispersed phase;

(ii) conversion of the applied colloidal system into a high flow (reduced viscosity) state by any external action (heating, shear straining, etc.) decreasing viscosity of the solution; this action can be either applied during the whole subsequent alignment stage or last for a minimum necessary time, so that the system would not relax into a state with increased viscosity during the alignment stage;

(iii) external alignment action upon the system, which can be produced using mechanical factors or by any other means; the degree of the external action must be sufficient for the kinetic units of the colloidal system to acquire the necessary orientation and form a structure that would serve as a base of the crystal lattice of the anisotropic thin crystal film;

(iv) conversion of the aligned region of the layer from the state of reduced viscosity, achieved due to the external action, into the state of the initial or higher viscosity; this transition is performed so as not to cause disorientation of the anisotropic thin crystal film structure and not to produce surface defects;

(v) final stage of solvent removal (drying), in the course of which the anisotropic thin crystal film structure is formed; this stage can also include an additional thermal treatment (annealing) characterized by the duration, character, and temperature, which are selected so as to ensure full or at least partial removal of water molecules from said crystal hydrate structure, while retaining the structure of supramolecules and crystalline structure of conjugated aromatic crystalline layer intact.

In the resulting anisotropic TCF, the molecular planes are parallel to each other and the molecules form a three-dimensional crystal structure, at least in a part of the layer. Optimization of the production technology may allow the formation of a single-crystal film. These films are disclosed in the present invention as base for manufacturing negative A-plate and negative or positive C-plate.

The TCF thickness usually does not exceed approximately 1 mkm. The film thickness can be controlled by changing the content of a solid substance in the applied solution and by varying the applied layer thickness. In order to obtain the films possessing desired optical characteristics, it is possible to use mixed colloidal systems (such mixtures can form joint supramolecules).

The mixing of said organic compounds in solutions results in the formation of mixed aggregates of variable composition. The analysis of X-ray diffraction patterns for dye mixtures allow us to judge about the molecular packing in supramolecules by the presence of a characteristic diffraction peak corresponding to interplanar spacing in the range from 3.1 to 3.7 Å. In general, this value is common for aromatic compounds in the form of crystals and aggregates. The peak intensity and sharpness increase in the course of drying, however, no changes in the peak position are observed. This diffraction peak corresponds to the intermolecular spacing within aggregates (stacks) and has been observed in the X-ray diffraction patterns of various materials. The mixing is favored by the planar structure of molecules (or their fragments) and by the coincidence of one molecular dimension in the organic compounds under consideration. In the applied aqueous layer, the organic molecules possess a long-range order in one direction, which is related to the alignment of supramolecules on the substrate surface. As the solvent is evaporated, it is energetically favorable for the molecules to form a three-dimensional crystal structure.

It's necessary to use for compensators the chemical compound non-absorbing in working ranges. The series of new chemical compounds, namely acenaphtho[1,2-b]quinoxaline sulfoderivatives, were synthesized which is well suited for the construction of optical compensators. These compounds have a general structural formula where n is an integer in the range of 1 to 4; m is an integer in the range of 0 to 4; z is an integer in the range of 0 to 6, and $m+z+n \leq 10$; X and Y are individually selected from the group consisting of $CH_3$, $C_2H_5$, $OCH_3$, $OC_2H_5$, Cl, Br, OH, and $NH_2$; M is a counter ion; and j is the number of counter ions in the molecule.

In other embodiments, the present invention provides a compensator wherein the structural formula of acenaphtho [1,2-b]quinoxaline sulfoderivative is chosen from the group consisting of structures I-VIII:

I where m is an integer in the range of 0 to 3, and z is an integer in the range of 0 to 6;

II where m is an integer in the range of 0 to 4, and z is an integer in the range of 0 to 5;

III where m is an integer in the range of 0 to 2, and z is an integer in the range of 0 to 6;

IV where m is an integer in the range of 0 to 4, and z is an integer in the range of 0 to 4;

V where m is an integer in the range of 0 to 3, and z is an integer in the range of 0 to 5;

VI where m is an integer in the range of 0 to 3, and z is an integer in the range of 0 to 4;

where m is an integer in the range of 0 to 2, and z is an integer in the range of 0 to 5;

where m is an integer in the range of 0 to 2, and z is an integer in the range of 0 to 4;

and where X, Y are individually selected from the group consisting of $CH_3$, $C_2H_5$, $OCH_3$, $OC_2H_5$, Cl, Br, OH, and $NH_2$, M is a counterion, and j is the number of counterions in the molecule.

The material formed from an acenaphtho[1,2-b]quinoxaline sulfoderivative is well suited for the construction of optical compensators for liquid crystal displays, although the present invention is not limited by using only this compound.

The present invention expands the assortment of compounds that are either not absorbing or only weakly absorbing in the visible spectral region and that are capable of forming a lyotropic liquid crystal (LLC) phase. High optical anisotropy (up to $\Delta n=0.6$ in the visible spectral range) and high transparency (extinction coefficients are on the order of $10^{-3}$) of the films allow high-efficiency compensators for LCDs to be designed.

EXAMPLE 1

A-plate compensator was produced according to the present invention and analyzed to determine the optical characteristics.

The lyotropic liquid crystal contained 14% the mixture of sulfoderivatives of acenaphtho[1,2-b]quinoxaline and 0,1% PAV (Zonyl FS 300). The LLC was coated onto a glass substrate (Display Glass) with a Mayer rod #1.5 at a temperature of 20° C., and a relative humidity of 65%. The film was dried at the same humidity and temperature. The thickness of made film is 390 nm.

Figure 7:
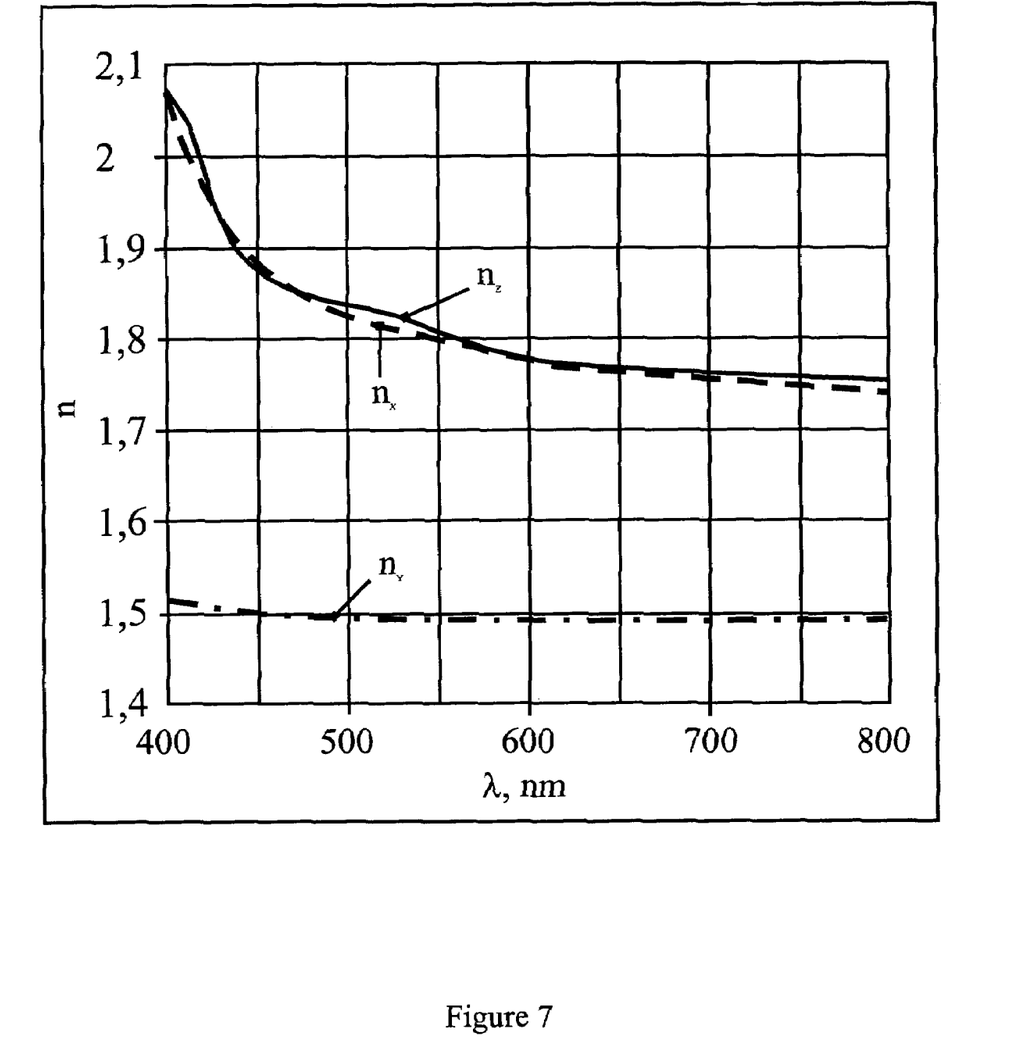
FIG. 7 shows the dependences of the refraction indices tensor components ($n_X$, $n_Y$, $n_Z$) on the wavelength for a film manufactured according to the present invention.

To determine optical characteristics of the film, sample transmission spectra were measured in polarized light in the wavelength range from 400 to 800 nm using Cary-500 spectrophotometer. The obtained data were used to calculate of the refraction indices tensor components ($n_X$, $n_Y$, $n_Z$) (FIG. 7). Here Z-axis is perpendicular to the surface of the film and Y-axes is parallel to the alignment direction. The produced film is A-plate compensator and exhibits high retardation characteristic $\Delta n=n_X-n_Y$ increasing from 0.24 up to 0.48 in the visible spectral range. The low values of absorption coefficients ($k_{X,Y,Z}<2*10^{-3}$) confirm high transparency of the film.

EXAMPLE 2

A-plate compensator was produced according to the present invention and analyzed to determine the film's optical characteristics. Twelve (12) grams of the mixture of sulfoderivatives of acenaphtho[1,2-b]quinoxaline were introduced with stirring at a temperature 20° C. into 65.0 g of deionized water. Then 5.3 ml of 25% aqueous ammonia solution were added and the mixture stirred to complete dissolution. The solution was concentrated on rotary evaporator to 30% and coated onto a polymer substrate (SONY-film, "Zeonor") with a Mayer rod #2.5 at a linear rate of 15 mm s$^{-1}$, a temperature of 20° C., and a relative humidity of 65%. The film was dried at the same humidity and temperature. This film on the substrate is a negative A-plate compensator.

To determine optical characteristics of the film, sample transmission spectra were measured in polarized light in the wavelength range from 400 to 800 nm using Cary-500 spectrophotometer. The findings demonstrate a very low absorbance of the film in the visible spectral range at the wavelength above 430 nm.

Figure 8:
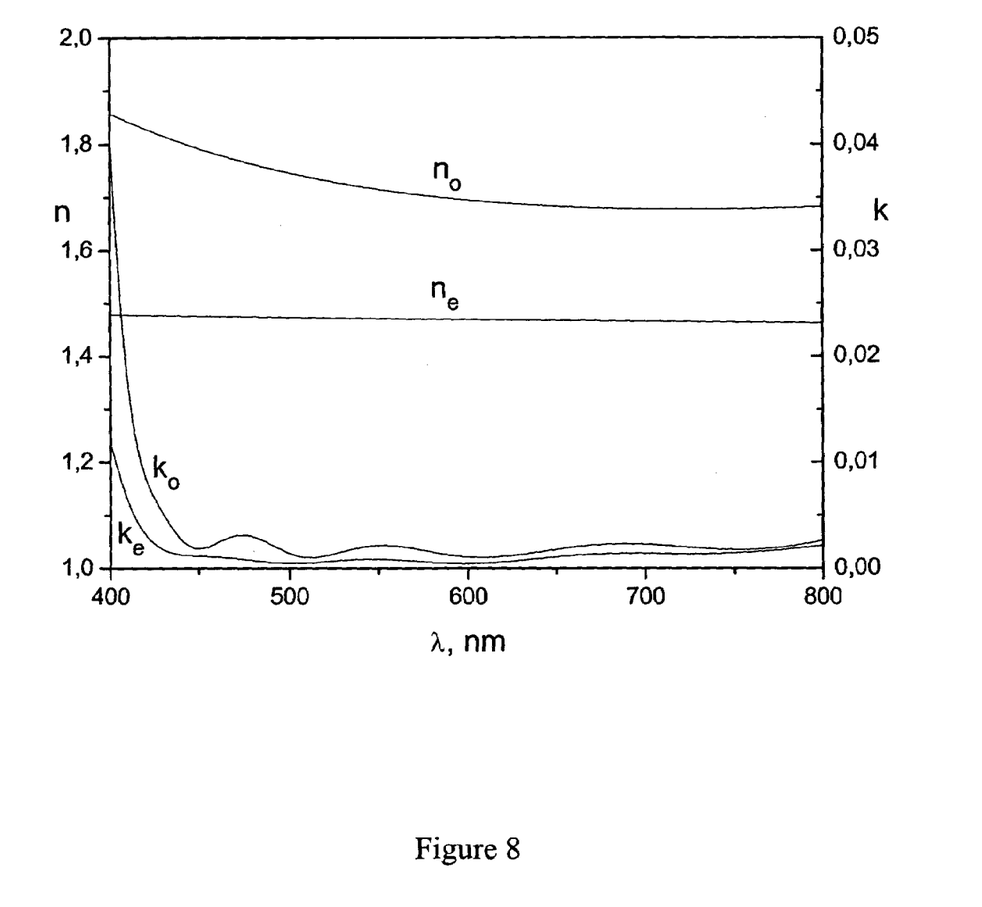
FIG. 8 shows the dependences of refraction indices ($n_e$, $n_o$) and absorption coefficients ($k_e$, $k_o$) on the wavelength for a film produced from "colorless material" (sulfonated acenaphtho[1,2-b]quinoxaline derivatives), measured parallel and perpendicular to the alignment direction.

The obtained data were used to calculate refraction indices ($n_e$, $n_o$) and absorption coefficients ($k_e$, $k_o$) parallel and perpendicular to the alignment direction (FIG. 8). The produced film is optically anisotropic and exhibits high retardation characteristic $\Delta n=n_o-n_e$ increasing from 0.21 up to 0.38 in the visible spectral range. The low values of absorption coefficients ko and ke confirm high transparency of the film.

EXAMPLE 3

C-plate compensator was produced according to the present invention as multilayer structure. This compensator has been obtained in the following way. Initially, anisotropic layer TCF has been formed on the polymer substrate as it was described above. Then, the separating layer of $SiO_2$ with thickness of 100 nm was deposited, and another the same anisotropic layer was deposited such that the directions of the optical axes of the first and the second anisotropic layers would be perpendicular. Any suitable transparent material may be used as the separating layer, for example: lacquer, polymer and etc.

EXAMPLE 4

Figure 9:
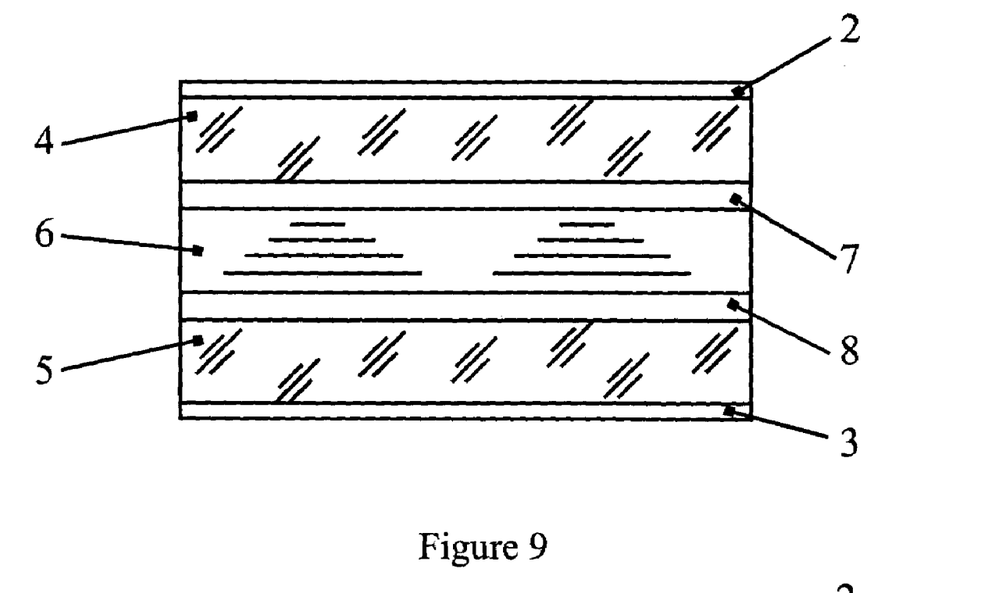
FIG. 9 is a block diagram showing the optical construction of a liquid crystal display with O-plate compensator.
Figure 10:
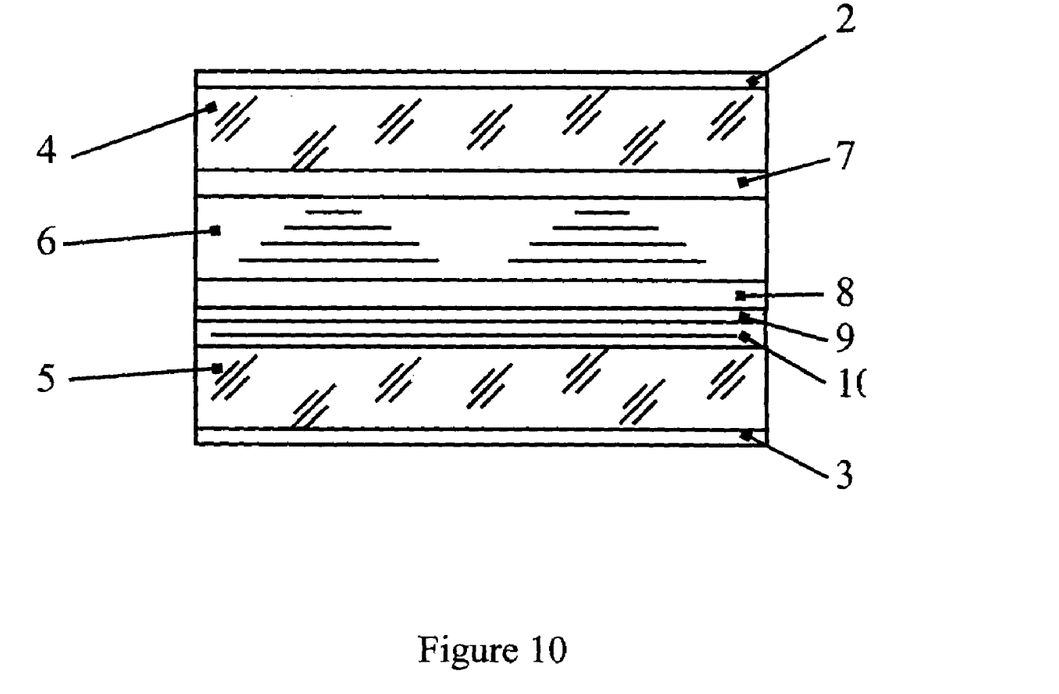
FIG. 10 is a block diagram showing the optical construction of a liquid crystal display according to the present invention.

FIGS. 9 and 10 demonstrate the block diagram of the optical construction of a liquid crystal displays comprising some compensation plates.

Figure 11:
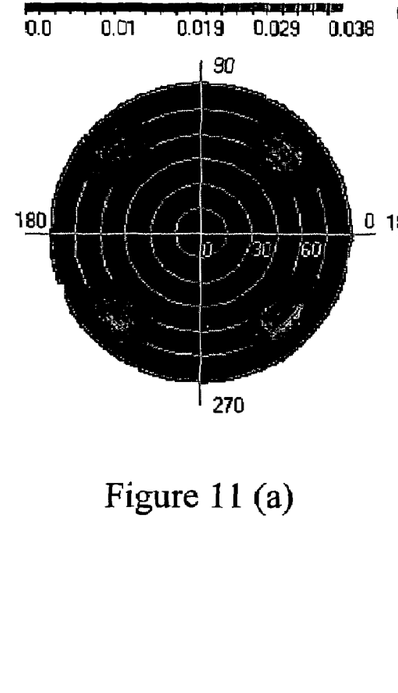
Figure 12:
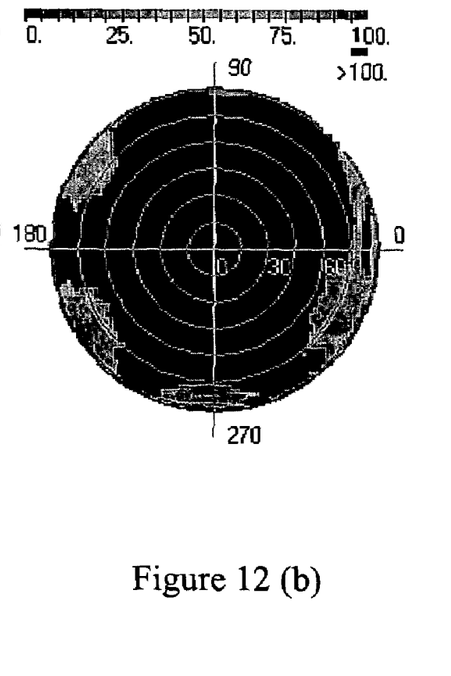
Figure 12A:
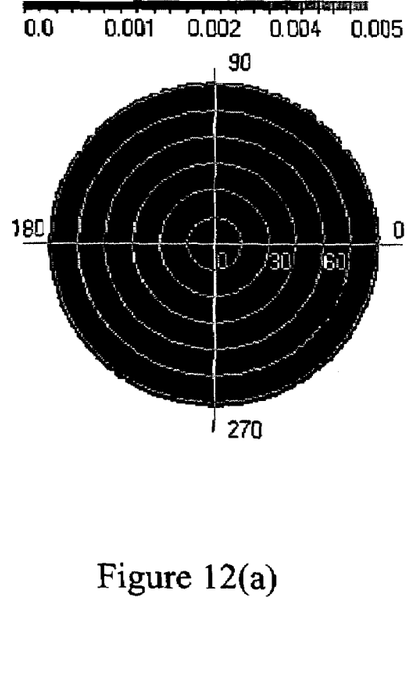
FIGS. 12(a) and (b) are the conoscopy (a) and contrast ratio map (b) for the twisted LC layer compensated by o-plates and A- and C-plates according to the present invention.

The schematic of twist-nematic liquid crystal display, as presented in FIG. 9, made according to a traditional compensation schema. This design comprises twist-nematic liquid crystal cell consisting of two parallel flat plates 4 and 5, the inside surface of which are coated with patterns of optically transparent conducting material and the alignment layer (not shown in Figure). The space between plates is filled with liquid crystal 6. The compensator setup includes two O-plates 7 and 8 manufactured by Fuji Photo Film Co., Ltd. FIGS. 11(*a*) and (*b*) show the conoscopy (a) and contrast ratio map (b) for the twisted LC with O-plates used as compensators.

The twist-nematic liquid crystal display manufactured according to the present invention (FIG. 10) comprises the twisted nematic cell 1, two polarizers 2 and 3, the compensated setup including two O-plates 7 and 8, and A-plate 9, and C-plate 10 according to the present invention. As O-plates we used O-plates manufactured by Fuji Photo Film Co., Ltd. Some physical parameters of said layers are shown in the Table 1.

| Element | Thickness, nm | Zenithal angle of the C-axis, (deg) | Azimuthal angle of the C-axis, (deg) | Optical anisotropy, $\Delta n = n_e - n_o$ |
|---|---|---|---|---|
| First polarizer of O-type, (2) | | 90 | 90 | |
| O-plate, (7) | 1 | 45 | 0 | −0.2 |
| Liquid Crystal layer, (ZLI-3092-000), (6) | 4.4 | | | +0.109 |
| O-plate, (8) | 1 | 45 | 90 | −0.2 |
| A-plate, (9) | 0.9 | 90 | 90 | −0.2 |
| C-plate, (10) | 1 | 0 | — | −0.2 |
| Second Polarizer of O-type, (3) | | 90 | 0 | |

The compensated set-up compensates both the LC layer and polarizers. FIGS. 11(*a*) and (*b*) shows the conoscopy (a) and contrast ratio map (b) for this LCD. The LCD with the considered optical design that along with the O-plates compensator setup comprises the disclosed by the present invention A- and C-plates shows excellent contrast-view angle properties in comparison with traditional schema.

What is claimed is:
1. A compensator for a liquid crystal display comprising at least one layer of a birefringent material
   wherein the birefringent material has a crystal structure formed by at least one polycyclic
   organic compound with conjugated π-system, and an intermolecular spacing of 3.4±0.3 Å is in the direction of at least one of optical axes, wherein the organic compound is an acenaphtho[1.2-b]quinoxaline sulfo-derivative of the general structural formula:

where n is an integer in the range of 1 to 4;
m is an integer in the range of 0 to 4;
z is an integer in the range of 0 to 6, and m+z+n≦10;
X and Y are individually selected from the group consisting of $CH_3$, $C_2H_5$, $OCH_3$, $OC_2H_5$, Cl, Br, OH, and $NH_2$;
M is a counterion; and
j is the number of counterions in the molecule.

2. The compensator according to claim 1, wherein said optical axis lies in a plane of the layer of the birefringent material and coincide with direction of said optical axis.

3. The compensator according to claim 1, wherein the structural formula of acenaphtho[1,2-b]quinoxaline sulfo-derivative is chosen from the group consisting of structures I-VIII:

where m is an integer in the range of 0 to 3, and z is an integer in the range of 0 to 6;

where m is an integer in the range of 0 to 4, and z is an integer in the range of 0 to 5;

where m is an integer in the range of 0 to 2, and z is an integer in the range of 0 to 6;

where m is an integer in the range of 0 to 4, and z is an integer in the range of 0 to 4;

where m is an integer in the range of 0 to 3, and z is an integer in the range of 0 to 5;

where m is an integer in the range of 0 to 3, and z is an integer in the range of 0 to 4;

where m is an integer in the range of 0 to 2, and z is an integer in the range of 0 to 5;

where m is an integer in the range of 0 to 2, and z is an integer in the range of 0 to 4;

and where X, Y are individually selected from the group consisting of $CH_3$, $C_2H_5$, $OCH_3$, $OC_2H_5$, Cl, Br, OH, and $NH_2$, M is a counterion, and j is the number of counterions in the molecule.

4. The compensator according to claim 1, wherein the said compensator operates as a negative A-plate.

5. The compensator according to claim 1, comprising at least two layers of the birefringent material, wherein said optical axes of two adjacent layers of birefringent material are mutually perpendicular.

6. The compensator according to claim 5, wherein said compensator operates as positive C-plate.

7. The compensator according to claim 5, wherein said compensator operates as negative C-plate.

* * * * *